June 19, 1962

L. E. FOGARTY 3,039,205

FLIGHT COMPUTER FOR TRAINING APPARATUS

Filed Sept. 3, 1958

LAURENCE E. FOGARTY
INVENTOR

BY *Richard G. Stephens*

ATTORNEY

United States Patent Office 3,039,205
Patented June 19, 1962

3,039,205
FLIGHT COMPUTER FOR TRAINING APPARATUS
Laurence E. Fogarty, Binghamton, N.Y., assignor to General Precision, Inc., a corporation of Delaware
Filed Sept. 3, 1958, Ser. No. 758,729
7 Claims. (Cl. 35—12)

This invention relates to improved training apparatus for computing the flight of simulated aircraft and missiles, and more particularly, to improved flight simulator apparatus which takes into account and accurately responds to several effects heretofore erroneously neglected in flight simulators. Prior art flight trainer computing apparatus commonly determined aircraft altitude and flight path by computing flight path elevation angle $\gamma$, which is the angle between the aircraft flight path direction measured in a vertical plane with respect to the horizontal, the horizontal being a line tangent to the surface of the earth at a point on the earth's surface directly between the instant location of the aircraft and the center of the earth. Aircraft rate of change of altitude commonly has been computed according to the relationship $h = V \sin \gamma$, wherein $h$ is aircraft rate of change of altitude, $V$ = aircraft air speed along its flight path, and $\sin \gamma$ is the vertical component of the aforementioned flight path elevation angle. Inasmuch as the path angle $\gamma$ has been measured with respect to an imaginary horizontal at the aircraft instant location, a flight at zero path elevation angle in prior art apparatus results in constant altitude, no matter the duration of the flight. Actually, it will be seen that if an aircraft is to fly completely around the earth, that the aircraft path must change through 360° during the flight in order to maintain the same altitude. The centrifugal force on any object is well known to be equal to the mass of the object times the square of its linear speed, divided by the radius of curvature of its path. This basic relationship holds true for travel through space, in inertial space, regardless of the presence or absence of a surrounding body such as the earth. Prior art flight simulating apparatus frequently has included means for computing the centrifugal force due to rate of change of path elevation angle, but such means invariably have been designed with an assumption that the earth remains still and fixed in space. It will be seen that since the radius of the earth is approximately 4000 miles, that the mass or speed of a moving object must be high in order for centrifugal force due to flying around the curved surface of the earth to become appreciable. With the advent of extremely high speed aircraft, rockets and missiles, centrifugal force of this nature can and does approach very appreciable proportions, so that recognition of the effect of centrifugal force must be included in order to accurately compute and track the position of high speed aircraft. The earth rotates about its axis from west to east, and an object fixed on the surface of the earth at the equator has a linear velocity in space of approximately 1000 miles per hour, and an angular velocity of 360 degrees/24 hours, giving rise to computable centrifugal force. If the object begins to travel in an easterly direction, its velocity with respect to the earth may be added to that of its instant earth location to compute an increased velocity in space. If the object instead travels in a westerly direction, its velocity with respect to the earth should be subtracted from the velocity of its instant earth location to determine a decreased velocity in space. Thus objects traveling east have more centrifugal force opposing gravity than objects traveling west, with a result that eastbound objects appear to be "lighter" than westbound objects.

Recent aircraft and imminent aircraft of the future are and shall be capable of flight to altitudes which are far greater than the ceilings of most contemporary aircraft. As aircraft operational altitudes have increased, a further defect of prior art training apparatus has been discovered, and the invention provides means to correct this further defect. The acceleration between two bodies may be specified as proportional to the product of their masses and inversely proportional to the square of the distance between their centers of gravity. Considering the earth as one of the bodies and the aircraft as the other, it will be seen that the applicable distance factor determining their attraction is the distance between the aircraft and the center of the earth. With the advent of aircraft capable of altitudes which become an appreciable fraction of the earth's radius, the aircraft to earth gravitational acceleration varies sufficiently in accordance with aircraft altitude, that account of aircraft altitude from the center of the earth must be taken in order to provide accurate and realistic computation. Thus it will be seen that principal objects of the present invention are to provide improved computer apparatus capable of taking into account the effect of centrifugal force due to flying around the curved surface of the earth in high speed aircraft, and also apparatus for taking into account the effect upon gravitation acceleration of extreme altitudes. Within this specification, the term "aircraft" is intended to mean all vehicles capable of guided travel away from the surface of the earth, whether supported by aerodynamic pressure or otherwise.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

Figure 1:
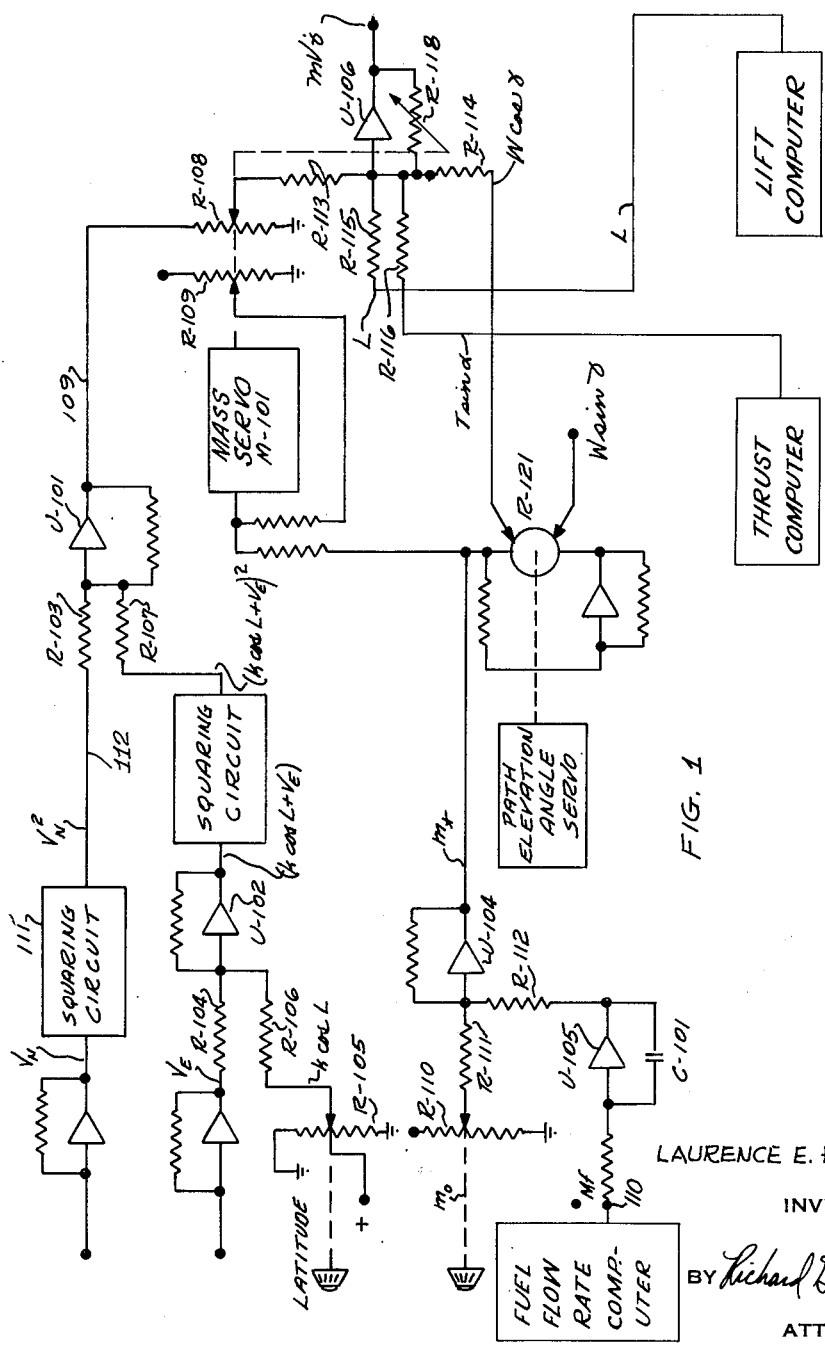
FIG. 1 is an electrical schematic diagram illustrating one manner in which one form of the present invention may be incorporated into contemporary flight trainers.

Referring to FIG. 1 there is shown exemplary apparatus constructed in accordance with the invention for realistically taking into account the effect of centrifugal force due to curvature of the surface of the earth. Initially, means are shown for receiving a derived potential commensurate with the square of the north-south velocity component $V_n$. In FIG. 1 a potential commensurate with the horizontal component of airspeed in a northerly direction derived in conventional analog computer manner is applied to a conventional potential squaring circuit shown in block form at 111. The $V_n$ potential may be derived using a number of diverse prior art techniques, one exemplary technique being shown in my copending application Ser. No. 477,741 filed December 27, 1954, now Patent No. 2,925,667, for "Aircraft Trainer Apparatus" and assigned to the same assignee as the present invention. Squaring circuit 111 also may take a variety of forms, many electronic squaring circuits being known in the art. The $V_n^2$ potential on conductor 112 is applied via scaling resistor R–103 to the input circuit of a computer summing means shown as comprising a conventional parallel-addition feedback amplifier U–101. Also derived in any convenient manner, as, for example, that shown in my mentioned copending application, is a potential commensurate with $V_e$, the easterly horizontal component of airspeed, which potential is applied via scaling resistor R–104 to a summing means shown as a comprising feedback amplifier U–102. Means shown as comprising a single manually-adjustable potentiometer resolver R–105 are provided to derive a potential commensurate with the cosine of latitude for application to summing means U-102 via summing resistor R-106. The $V_e$ and $k \cos L$ voltage applied to amplifier U-102 result in an output potential commensurate with ($k \cos L + V_e$), where $k$ is a constant determined by resistor scaling, in accordance with known techniques. If a latitude computer is provided in the apparatus into which the invention is to be installed, the shaft of resolver R-105 may be positioned automatically rather than manually by provision of a simple position servo means (not shown). The $k \cos L$ potential, as will be explained below, is commensurate with easterly velocity of the aircraft in inertial space due to rotation of the earth about its axis in an inertial frame assumed to be fixed in space at the center of the earth. Combination of this potential with the $V_e$ potential provides a quantity commensurate with the total velocity of the aircraft in inertial space. The output potential from summing means U-102 is "squared" by a conventional potential squaring apparatus, which may take the same form as circuit 111 if desired, to provide a $(k \cos L + V_e)^2$ potential, the latter being applied via scaling resistor R-107 to summing means U-101. Thus an output potential commensurate with the quantity $[V_n^2 + (k \cos L + V_e)^2]$ is provided at the output circuit of summing means U-101.

If the origin of the cordinates of inertial space are considered to be fixed at the center of the earth, the output quantity from summing means U-101 will be substantially equal to the velocity squared of the aircraft in inertial space. By modifying such quantity in accordance with the ratio between aircraft mass and radius of curvature $m/r$, the centrifugal force in inertial space may be computed.

It is known in elementary mechanics that $$F_c = \frac{mV^2}{r}$$

where $F_c$ = centrifugal force
$m$ = mass
$V^2$ = linear velocity squared
$r$ = radius of rotation Applying the above relationship to the problem at hand, $m$ may be seen to be the mass of the aircraft, $V^2$ the velocity squared *in inertial space* of the aircraft, and $r$ the radius of curvature of the aircraft path. In practicing the invention it is often desirable in the interests of simplicity and economy to approximate the radius of curvature $r$ by assuming that it corresponds to the radius of the earth, approximately 4000 miles, although the actual radius of curvature for most precise computation comprises the radius of the earth *plus* the aircraft altitude. In most contemporary manned aircraft the altitude remains an insignificant fraction of the earth radius and may be neglected without noticeable error.

The velocity of the aircraft with respect to inertial space may be computed by combining the effects of the velocity of the aircraft with respect to the earth's surface with the effects of rotation of the earth with respect to inertial space, "inertial space" in this sense neglecting the earth's orbital velocity about the sun and the drift of the solar system with respect to other celestial bodies. Assuming the earth to have an equatorial circumference of 24,000 miles, it will be seen that rotation of the earth through one revolution in one day means that any point on the equator travels approximately 1,000 miles per hour. The velocity of any point on the earth's surface due to rotation of the earth may be expressed as follows:

$$V_e = r_1 w_e$$

where
$V_e$ = velocity
$r_1$ = the distance of the point from an axis joining the North and South poles.
$w_e$ = earth's angular velocity, one revolution per day The distance $r_1$ for any point may be seen to vary in accordance with the cosine function of latitude, it being assumed that the earth is a true sphere rather than an oblate spheroid. Since the earth rotates from west to east and may by definition be considered to have no appreciable north-south velocity component, the easterly velocity component of the aircraft in "inertial space" will be comprised of $V_E$, the easterly velocity component of the aircraft with respect to the earth plus the velocity component of the latitude location of the aircraft $V_e$, or $k \cos L$, making the total easterly velocity of the aircraft in "inertial space" equal $(V_E + V_e)$. The northerly velocity component of the aircraft in inertial space corresponds to the northerly velocity component of the aircraft with respect to earth, $V_n$.

The easterly and northerly components of aircraft velocity in inertial space may be combined vectorially by taking the square root of the sum of their squares, or $$V = [V_n^2 + (V_E + V_e)^2]^{1/2}$$

This will be seen to express aircraft velocity V in inertial space, and to be equal to the square root of the quantity provided at the output circuit of summing means U-101.

The inertial velocity squared potential on conductor 109 may be modified or scaled in accordance with aircraft mass and flight path radius of curvature as mentioned above to provide a potential commensurate with centrifugal force. In FIG. 1 the potential on conductor 109 is shown connected to excite potentiometer R-108, the arm of which may be positioned manually or automatically in accordance with aircraft mass or in accordance with aircraft weight. If gravitational acceleration is assumed to be constant, aircraft weight may be assumed to be directly proportional to aircraft mass. If the aircraft flies at great distances from the earth, as will be discussed below, gravitational acceleration may vary appreciably. In FIG. 1 the arm of potentiometer R-108 is shown positioned by a conventional position servo shown in block form at M-101. Servo M-101 may comprise a conventional analog computer position servo equipped with a follow-up or rebalancing potentiometer R-109 and connected to receive a resultant potential commensurate with aircraft mass or weight from a summing means shown as comprising feedback amplifier U-104. A potential commensurate with the basic structural mass of the aircraft may be derived by adjustment of potentiometer R-110 and applied to amplifier U-104 via scaling resistor R-111. A direct potential commensurate with the mass rate of fuel consumption or expenditure derived elsewhere in conventional manner is applied at terminal 110 to be integrated with respect to time by integrator means shown as comprising an operational amplifier U-105 having a feedback capacitor C-101, thereby supplying an input potential to amplifier U-104 via scaling resistance R-112 commensurate with the aircraft mass component due to fuel. Thus summing amplifier U-104 provides a control signal to servo M-101 commensurate with total aircraft mass, the servo positioning the arm of potentiometer R-108 so as to modify the inertial velocity potential in proportion to aircraft mass. The potential derived on the arm of potentiometer R-108 may be utilized in most applications as being proportional to centrifugal force, although it involves an approximation that aircraft altitude above the earth remains an insignificant fraction of the earth's radius. The potential on wiper of potentiometer R-108 may be used without modification as a signal commensurate with centrifugal acceleration, if aircraft altitude is considered to remain an insignificant fraction of the earth's radius.

Various computer systems track the motion of aircraft by summing forces in two perpendicular directions, usually along the flight path and perpendicular to the flight path, or by summing accelerations in two such directions. The potential on conductor 109 may be used for a system which sums accelerations, and the potential derived by potentiometer R-108 may be used for a system which sums forces, bearing in mind the approximation inherent in either signal. In FIG. 1 the centrifugal force potential from potentiometer R-108 is applied via scaling resistor R-113 to the input circuit of a summing means U-106 which sums forces acting perpendicularly to the aircraft flight path. The centrifugal force due to flying around the curvature of the earth acts in opposition to the force of gravity, and hence the potential applied to amplifier U-106 is of opposite polarity to the W cos γ, or component of weight potential applied via resistor R-114. The centrifugal force potential from potentiometer R-108 is of the same polarity as the lift force potential applied via resistor R-115 and the thrust component potential T sin α applied via resistor R-116. Means for computing the weight, thrust and lift terms are well-known in the art and need not be shown here. It will be recognized that these terms are shown in abbreviated form for sake of simplicity, and that in actual apparatus they may exist in various other forms, especially in forms in which they are further modified in accordance with bank angle and sideslip angle. The potentials applied to amplifier U-106 are each commensurate with a force acting normally to the aircraft flight path, and the output potential from summing amplifier U-106 is commensurate with their algebraic sum; the resulting force acting normally to the flight path. This output potential may be used in conjunction with known techniques to provide improved computation of the aircraft motion. In some applications it may be considered desirable to make feedback impedance R-118 of amplifier U-106 variable as a function of aircraft mass or weight in order to provide an output signal from the amplifier commensurate with an acceleration rather than a force, as will be apparent at this point to those skilled in the art. One most usual use of the output potential from amplifier U-106 is the computation of rate of change of path elevation angle. The resultant force acting normal to the aircraft flight path equals $mV\dot{\gamma}$, the product of aircraft mass, velocity and path elevation angular rate. If the $mV\dot{\gamma}$ output of amplifier U-106 is divided by, or modified inversely in accordance with, $m$ (mass) and $V$ (velocity), the quantity $\dot{\gamma}$, rate of change of path elevation angle, will be obtained. This quantity may be integrated with respect to time by conventional means to provide the $\gamma$ (path elevation angle quantity). For example, in some embodiments of the invention the path elevation angle servo shown in block form in FIG. 1 will comprise a velocity servo integrator or alternatively an electronic integrator, such as the well-known Miller integrator, connected to operate a conventional position servomechanism. In either case, the input voltage may be derived by dividing the output potential of amplifier U-106 in accordance with mass and velocity.

In some flight simulators the simulated flight path elevation angle is not produced as a shaft position, and where the quantity is needed for computation combined functions of α (angle of attack) and θ (pitch angle) are used in place of γ terms. Thus in some flight simulators the W cos γ term applied to the forces summing circuit is replaced by weight terms which are functions of α and θ. This does not affect application of the invention to the simulator. In flight simulators of this nature, the output of the forces summing amplifier U-106 usually is not integrated (after division by mass and velocity) to obtain path elevation angle γ, but the $\dot{\gamma}$ quantity is, for example, instead first combined with another angular rate term proportional to $\dot{\alpha}$, rate of change of angle of attack, to provide a composite quantity which may be integrated to obtain pitch angle θ. In other simulators $\dot{\gamma}$ is combined with θ to provide a quantity which may be integrated to obtain $\dot{\alpha}$. Improved techniques for computing the longitudinal motion of simulated aircraft are shown in U.S. Patent Number 2,935,796 of John M. Hunt and applicants' prior Patent 2,925,667. The present invention may be incorporated into either of these previous systems, as well as into other prior art systems.

As mentioned above, if aircraft altitude above the earth becomes a significant fraction of the earth's radius, gravitational acceleration should be considered as a variable rather than a constant. A general law of physics relating the attraction between two bodies may be written as follows:

$$W = k_1 \frac{m_1 m_2}{r^2}$$

wherein

W is the force of attraction between the two bodies,
$m_1$ and $m_2$ are the respective masses of the bodies,
$r^2$ is the distance between the centers of gravity of the two bodies, and
$k_1$ is a scaling constant.

Applying the above principle to an aircraft weight problem, $$W = k_1 \frac{m_a m_e}{r^2}$$

wherein W is the weight of the aircraft, $m_a$ is the mass of the aircraft, $m_e$ is the mass of the earth, and $r^2$ is the distance between the center of the earth and the center-of-gravity of the aircraft. If the earth is considered to be a true sphere, it will be seen that:

$$r = r_e + h$$

wherein $r_e$ is the radius of the earth and $h$ is aircraft altitude above the earth, so that:

$$W = \frac{k_1 m_a m_e}{(r_e + h)^2}$$

Figure 2:
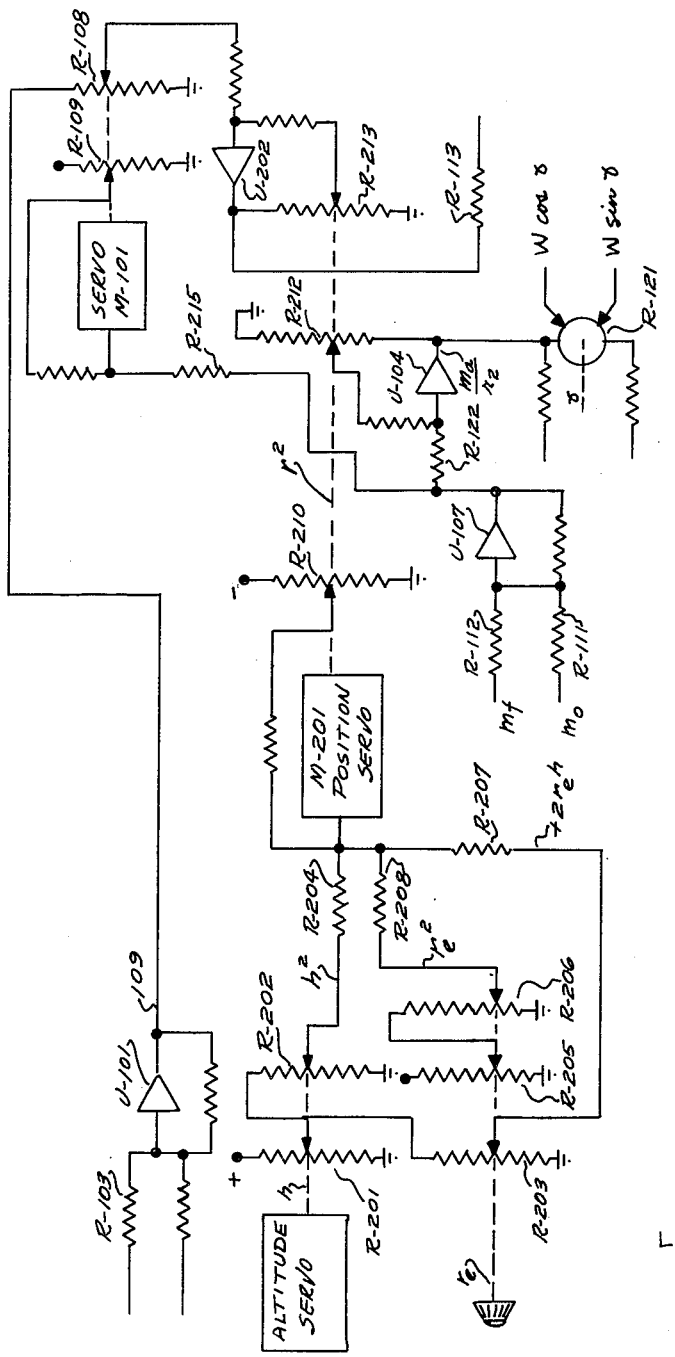
FIG. 2 is an electrical schematic diagram of an alternate embodiment of the invention in which effects of altitude on gravitational acceleration also are simulated.

It will be seen that if altitude $h$ remains an insignificant fraction of $r_e$, the radius of the earth, that the weight of an aircraft having a given mass will not change, but that the gravitational pull of the earth on the aircraft will diminish as altitude $h$ increases greatly. FIG. 2 illustrates apparatus for properly taking into account the effects of extreme altitude on gravitational acceleration. Means shown as comprising simple linear potentiometers R-201 and R-202 are provided for deriving potentials commensurate with aircraft altitude $h$ and altitude squared, $h^2$. The $h$ potential on the arm of potentiometer R-201 is applied to excite potentiometer R-203 and potentiometer R-202. The wiper arms of potentiometers R-201 and R-202 may be positioned manually or preferably automatically, as by means of a conventional position servo, in accordance with aircraft altitude above the earth. The potential on the arm of potentiometer R-202, which varies as the square of altitude, is applied via scaling resistor R-204 to the input circuit of a conventional position servo M-201. The sliders of potentiometers R-203, R-205 and R-206 each are positioned in accordance with the radius of the earth. It will be seen that with appropriate scaling potentiometer R-203 may apply a potential commensurate with $+2r_e h$ to the servo M-201 input circuit via summing resistor R-207, while potentiometer R-206 may apply a potential commensurate with $r_e^2$ via resistor R-208. In adapting the invention to interplanetary or space travel problems, it is desirable that variable impedances be provided at R-203, R-205 and R-206, so that these impedances may be adjusted, for example, to values commensurate with the radius of the earth's moon or other space body. In such case, the altitude input to potentiometers R-201 and R-202 should be, of course, the altitude distance between the moon surface or other body surface and the aircraft. For most uses of the invention, however, variable potentiometers R-203, R-205 and R-206 may be omitted, the radius of the earth being a constant.

The $h^2$, $r_e^2$ and $+2r_e h$ potentials applied to the input circuit of position servo M-201 may be seen to be proportional to the expanded terms of the expression $(r_e + h)^2$. These potentials are compared with a rebalancing potential derived by follow-up potentiometer R–210, thereby solving the equation $$(r_e+h)^2=r^2$$

so that position servo M–201 provides an output shaft position commensurate with $r^2$. Alternatively, potentiometer R–210 may comprise a square function potentiometer, or a pair of cascaded linear potentiometers connected to provide a square function, so that servo M–201 will provide a shaft output position directly proportional to $r$. As will be recalled from FIG. 1, amplifier U–104 receives components of aircraft mass potential as inputs via resistors R–111 and R–112. In FIG. 2 the output voltage from amplifier U–104 is applied to excite potentiometer R–212, the arm of which is positioned by servo M–201 in accordance with $r^2$. The amplifier U–104 circuit acts to provide an output voltage commensurate with the ratio between the aircraft total mass and $r^2$, the square of the distance between the aircraft and the center of the earth. Since $m_e$, the mass of the earth, and the universal gravitational constant are constant, it will be seen that the output potential of amplifier U–104 is also directly proportional to the aircraft-earth gravitational attraction or weight. Obviously, the earth mass and universal gravitational constant may be effected by appropriate resistance scaling in either the input circuit or output circuit of amplifier U–104. The output potential from amplifier U–104 is shown applied to excite resolver R–121 in the same manner as in FIG. 1 to resolve the aircraft weight into forces acting along and perpendicular to the flight path.

The output potential from amplifier U–107, which is proportional to aircraft mass, is applied as shown via scaling resistor R–215 to the input circuit to servo M–101. The inertial velocity squared potential on conductor 109 is shown connected to be modified by operation of servo M–101 and potentiometer R–108 in manner similar to that described above in connection with FIG. 1, but the potential is further modified in FIG. 2 by the circuit of amplifier U–202 prior to its application via resistor R–113 to the forces summing circuit. The output potential from amplifier U–202 is applied to excite the winding of potentiometer R–213, the arm of which is positioned by servo M–201, thereby providing an output potential commensurate with the correct centrifugal force with the effect of gravitational variation realistically included.

It will thus be seen that the objects set forth above, among those made apparent from the preceding description, are efficiently attained, and since certain changes may be made in the above constructions without departing from the scope of the invention, it is intended that all matter contained in the above description or shown in the *ac*companying drawing shall be interpreted as illustrative and not in a limiting sense.

Having described my invention, what I claim as new and desire to secure by Letters Patent is:

1. Flight simulator training apparatus for computing motion of an aircraft in a direction normal to its instantaneous simulated flight path comprising, in combination, means for deriving potentials commensurate with simulated lift, a simulated weight component, and a simulated thrust component, each of said components acting in a direction normal to said simulated flight path, means for deriving a further potential commensurate with simulated centrifugal force due to rotation of said aircraft axes in an inertial frame assumed to be fixed in space at the center of the earth, and circuit means for combining said potentials to provide an output quantity commensurate with total normal forces acting on said aircraft.

2. Apparatus according to claim 1 in which said circuit means includes means for modifying said output quantity inversely in accordance with aircraft mass, thereby to provide a resultant output quantity commensurate with normal acceleration of said aircraft.

3. Apparatus according to claim 1 in which said means for deriving said centrifugal force potential comprises means for deriving a first potential commensurate with the square of the northerly component of velocity of said aircraft, means for deriving a second potential commensurate with the easterly component of velocity of said aircraft, means for deriving a third potential commensurate with the instantaneous latitude of said aircraft, means for combining and squaring said second and third potentials to provide a fourth potential, means for combining said first and fourth potentials to provide a fifth potential and for modifying said fifth potential in accordance with aircraft mass to provide said centrifugal force potential.

4. Apparatus for computing motion of a simulated aircraft, comprising, in combination, means for deriving a constant potential commensurate with the simulated fixed structural mass of said aircraft, means for deriving a second potential varying in accordance with simulated mass variations in said simulated aircraft due to simulated expenditure of fuel, cargo and the like, means for combining said potentials and for modifying the combined potential in accordance with a function of simulated altitude of said aircraft to provide a further potential commensurate with simulated weight of said aircraft, and means responsive to said further potential for computing simulated accelerations of said aircraft.

5. Apparatus according to claim 4 in which said means for modifying the combined potential includes a servomechanism operable to provide an output shaft position varying in accordance with a function of the distance of said aircraft from the center of the earth, means for deriving a first computer quantity commensurate with simulated altitude of said aircraft above the surface of the earth, and means for deriving a second computer quantity commensurate with an assumed radius of the earth, said servomechanism being responsive to said first and second computer quantities.

6. Apparatus for computing motion of a simulated aircraft in a direction normal to its simulated flight path, comprising, in combination, means for deriving potentials commensurate with lift and engine thrust component normal to said flight path, means for deriving a potential commensurate with aircraft mass, means for deriving a potential commensurate with flight path elevation angle, means for modifying said potential commensurate with aircraft mass in accordance with the value of said flight path elevation angle potential to provide a second potential; means for deriving a third potential commensurate with the northerly velocity of said aircraft along its flight path with respect to the earth; means for deriving a fourth potential commensurate with inertial velocity of said aircraft due to easterly velocity of said aircraft with respect to the earth and due to rotation of the earth about its axis in an inertial frame assumed to be fixed in space at the center of the earth; means for combining said third and fourth potentials to provide a further potential; and circuit means for combining said lift and thrust component potentials, said second potential and said further potential to provide an output quantity commensurate with forces acting on said aircraft in a direction normal to said flight path.

7. Apparatus according to claim 6 including means responsive to said simulated aircraft mass potential for modifying said output quantity inversely in accordance with simulated aircraft mass, thereby to provide a resultant output quantity commensurate with acceleration of said aircraft in a direction normal to said flight path.

References Cited in the file of this patent

UNITED STATES PATENTS

| | | |
|---|---|---|
| 2,701,111 | Shuck | Feb. 1, 1955 |
| 2,804,698 | Grandmont | Sept. 3, 1957 |
| 2,842,866 | Stern et al. | July 15, 1958 |
| 2,858,623 | Stern et al. | Nov. 4, 1958 |